Nov. 24, 1936. H. C. WILLIAMSON 2,061,642
PRESSURE CONTROL MECHANISM FOR DRAFT TUBES
Filed Feb. 14, 1935 2 Sheets-Sheet 1

Nov. 24, 1936.     H. C. WILLIAMSON     2,061,642
PRESSURE CONTROL MECHANISM FOR DRAFT TUBES
Filed Feb. 14, 1935     2 Sheets-Sheet 2

Inventor:
Henry C. Williamson,
By Bertha L. MacGregor
Attorney

Patented Nov. 24, 1936

2,061,642

UNITED STATES PATENT OFFICE 2,061,642

PRESSURE CONTROL MECHANISM FOR DRAFT TUBES

Henry C. Williamson, Chicago, Ill., assignor to The Beckley-Ralston Co., Chicago, Ill., a corporation of Illinois Application February 14, 1935, Serial No. 6,460

5 Claims. (Cl. 225—3)

This invention relates to pressure control mechanism for draft tubes and more particularly to a mechanism for dispensing beer, for maintaining it under proper pressure, and for relieving the beer of excess $CO_2$ gas without wasting the product.

The main object of the invention is to provide a compact, unitary structure, efficient for the purposes described, which will automatically maintain desired $CO_2$ gas pressure on the beer to be dispensed by the tap.

In the drawings:—

Figure 1:
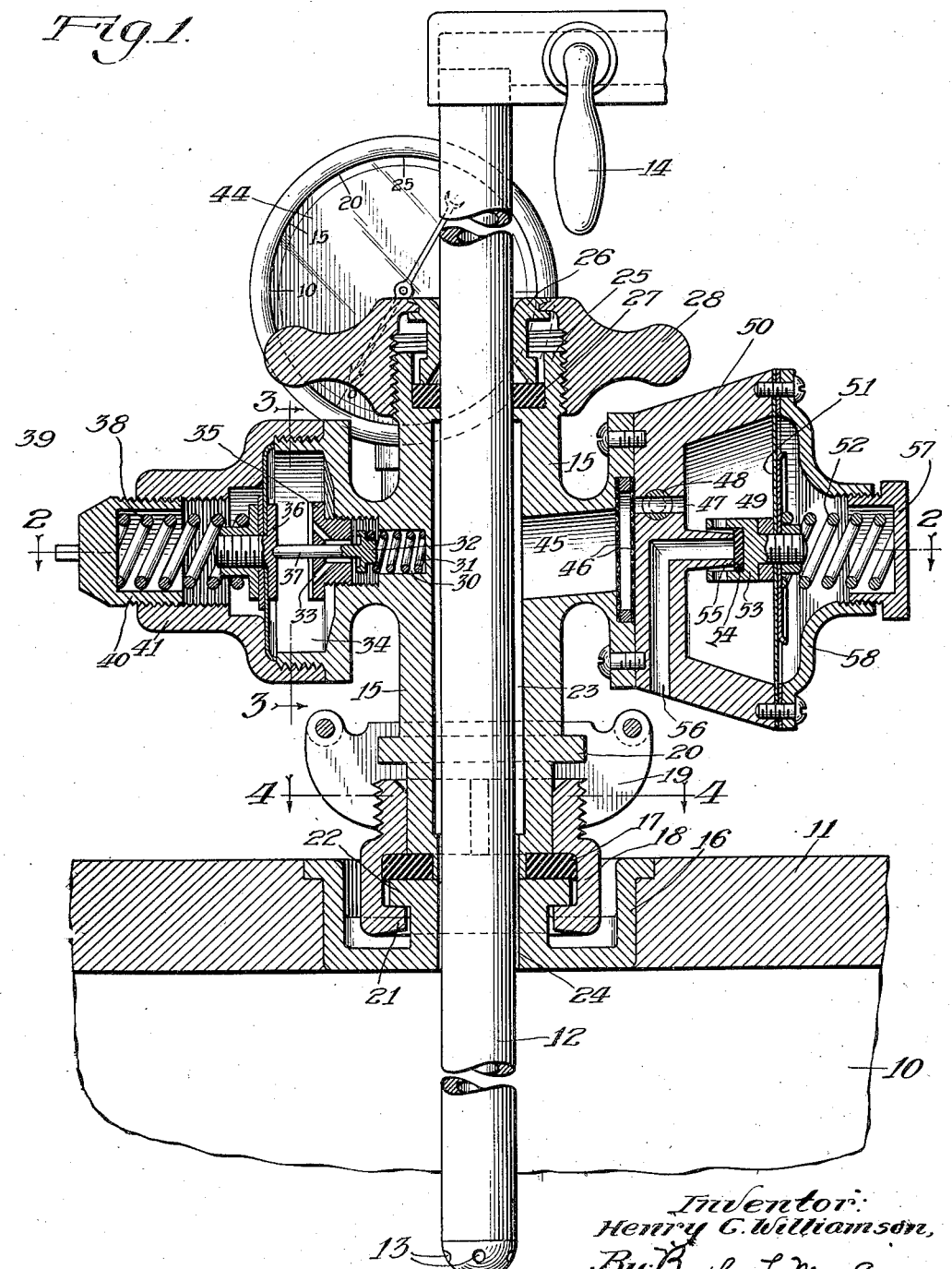
Fig. 1 is a vertical sectional view of a beer tap and control mechanism embodying my invention.
Figure 2:
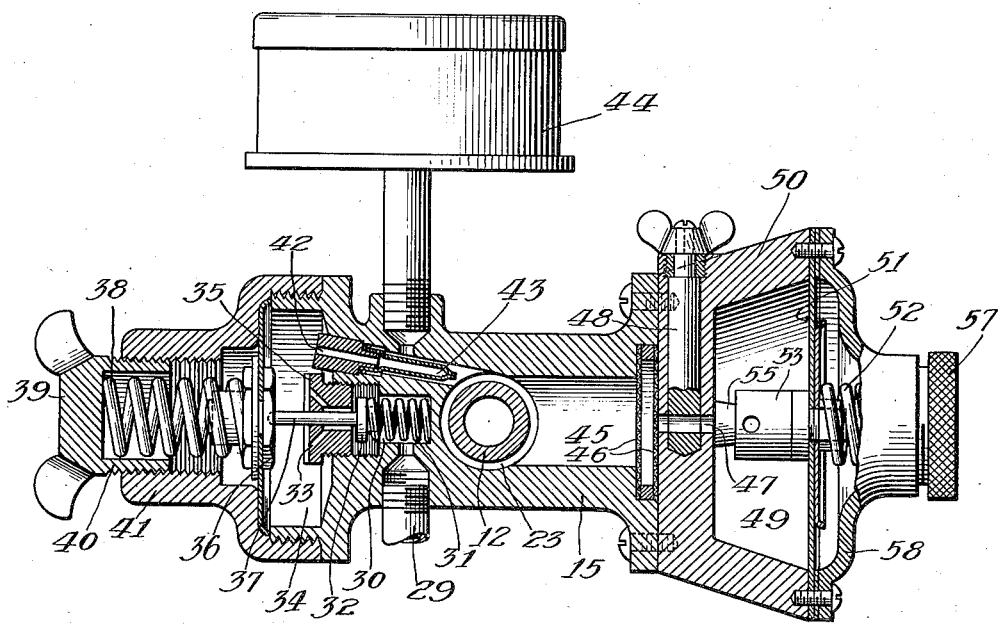
Fig. 2 is a horizontal section taken on the line 2—2 of Fig. 1.
Figure 3:
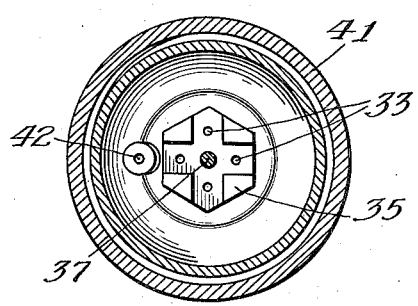
Fig. 3 is a vertical section taken on the line 3—3 of Fig. 1.
Figure 4:
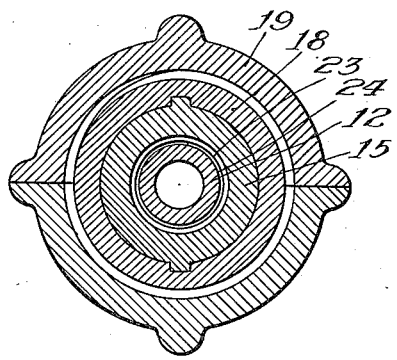
Fig. 4 is a horizontal section taken on the line 4—4 of Fig. 1.

In that embodiment of the invention shown in the drawings, a beer container is indicated at 10. It is provided with a top wall 11 which is centrally apertured to receive the metal conduit 12 of the tap. The conduit 12 has apertures 13 in its lower end through which beer is forced into the conduit to be dispensed by actuating the handle 14.

The invention comprises a centrally vertically bored housing or casting 15 in which the draft tube or conduit 12 is mounted. The container wall 11 is provided with a flanged annular bushing 16 on which rests a gasket 17 and the casting 15 is supported on the gasket 17 and held in position by a flanged collar 18. The collar 18 is externally threaded on its upper portion to be engaged by a two-piece clamping member 19 which is internally grooved and threaded to fit the flange 20 of the casting 15 and the threads of the collar 19. The collar 18 is provided with oppositely located lugs 21 which engage the lower surface of the lugs 22 of the bushing 16.

The conduit 12 extends through the central aperture of the bushing 16 into the container 10. The central bore of the casting 15 is enlarged between its upper and lower ends to provide an annular chamber 23 and a narrow annular space 24 surrounding the conduit 12.

The upper end of the casting 15 is screw threaded at 25. A collar 26 rests on a gasket 27 located on the upper end of the casting. The collar 26 and screw threaded portion of the casting are engaged by a screw threaded collar or nut 28 to hold the parts securely together.

At the left hand side of the tap the casing 15 is provided with a horizontally disposed port 29 through which $CO_2$ gas under pressure is supplied to the horizontally disposed cylindrical chamber 30 in which a spring 31 is located. The spring bears on a valve 32 which controls the ports 33. Said ports communicate with the chamber 30 and a chamber 34 at opposite sides of the valve seat 35. A diaphragm 36 contacts with the stem 37 of the valve 32 at one side and a coiled spring 38 bears on the opposite side of the diaphragm. The spring is adjustable by a wing nut 39 on a cup-shaped retaining member 40 which is screwed into the end of the housing member 41 attached to the casting 15. The chamber 34 communicates with the annular chamber 23 through a valved passage 42, the valve being indicated at 43. A gauge 44 indicates the pressure in the passage 42.

$CO_2$ gas is supplied through the port 29 and allowed to pass into the chamber 30, around the valve 32 through the ports 33 of the valve seat 35 into the chamber 34, then through the passage 42 into the annular chamber 23 and space 24 into the beer container 10. The spring 38 is adjusted according to the $CO_2$ gas pressure desired, usually about seven and one-half pounds. The spring controls the normal position of the diaphragm 36 and valve 32. If the $CO_2$ gas pressure in the chamber 30 becomes excessive, the pressure on the valve 32 will restrict the passage of gas through the ports 33. The valve 43 prevents back pressure of the gas in the spaces 23 and 24.

At the right hand side the casting 15 is provided with a cylindrical passage 45 relatively large in diameter and slightly inclined downwardly toward the conduit 12 with which it communicates. At its other end the passage 45 terminates in a double screen 46 of closely woven wire mesh. A small conduit 46, provided with a valve 48, communicates with the screened passage 45 at one end and with a chamber 49 at its other end. Said chamber 49 is formed within a housing 50 secured to the casting 15. A diaphragm 51, mounted in the housing 50, is controlled by a spring 52. The diaphragm carries a cup-shaped valve member 53 provided with ports 53' and a gasket 54 which normally fits on the valve seat 55. The part 55 and housing wall 50 are provided with a passage 56. A cap or nut 57 is screwed into the housing 58 which is attached to the housing 50 for enclosing and adjusting the spring 52.

Frequently beer is delivered to the dispenser under excess $CO_2$ gas pressure, or excess gas may form in the beer. In order to relieve the beer of such excess gas, without wasting the product, I have provided the construction herein described.

The excess gas, with beer and foam, rises from the container 10, passing into the space 24 and annular chamber 23 to the passageway 45 where the foam is blocked by the double screen 46, while the excess $CO_2$ gas passes through the passage 47 to the chamber 49. There it presses on the diaphragm 51 causing the diaphragm to draw the valve member 53—54 away from the seat 55, thus permitting the gas to escape through the ports 53' and passageway 56 to the atmosphere.

Changes may be made in details of construction without departing from the scope of my invention and I do not intend to be limited to the exact form shown and described, except as set forth in the appended claims.

I claim:—

1. A beer tap and control mechanism comprising a housing adapted to be connected with a beer container, a draft tube extending through the housing and adapted to enter the beer container, the tube and housing being spaced apart to form an annular chamber closed at one end and adapted to communicate at its other end with the beer container, a chamber in the housing communicating with the beer container externally of the draft tube, a gas intake for said chamber, valve mechanism in the chamber controlling the supply of gas to the beer container, a second chamber in the housing having a valved exit to the atmosphere, a relatively large screened passageway and a relatively small, valve-controlled passageway communicating with each other and located between said second chamber and the annular chamber.

2. A beer tap and control mechanism comprising a housing adapted to be connected with a beer container, a draft tube extending through the housing and adapted to enter the beer container, the tube and housing being spaced apart to form an annular chamber closed at one end and adapted to communicate at its other end with the beer container, a chamber in the housing, a valved passage connecting the chamber with the beer container externally of the draft tube, a gas intake for said chamber, valve mechanism controlling the supply of gas to the chamber, a second chamber in the housing having a valved exit to the atmosphere, a relatively large screened passageway and a relatively small, valve-controlled passageway communicating with each other and located between said second chamber and the annular chamber.

3. A beer tap and control mechanism comprising a housing adapted to be connected with a beer container, a draft tube extending vertically through the housing and adapted to enter the beer container, the tube and housing being spaced apart to form an annular chamber closed at its top and adapted to communicate at its bottom with the beer container, a chamber in the housing communicating with the beer container externally of the draft tube, a gas intake for said chamber, valve mechanism in the chamber controlling the supply of gas to the beer container, a second chamber in the housing having a valved exit to the atmosphere, a relatively large screened passageway and a smaller valve-controlled passageway communicating with the upper portion of said screened passageway and located between said second chamber and the annular chamber.

4. A beer tap and control mechanism comprising a housing adapted to be connected with a beer container, a draft tube extending through the housing and adapted to enter the beer container, the tube and housing being spaced apart to form an annular chamber closed at one end and adapted to communicate at its other end with the beer container, a chamber in the housing communicating with the beer container externally of the draft tube, a gas intake for said chamber, a valve seat located in said chamber, a valve having a stem extending through said seat, a diaphragm mounted in the chamber and engaging said stem, a spring bearing on the valve, a second chamber in the housing having a valved exit to the atmosphere, a relatively large screened passageway and a relatively small, valve-controlled passageway communicating with each other and located between said second chamber and the annular chamber.

5. A beer tap and control mechanism comprising a housing adapted to be connected with a beer container, a draft tube extending through the housing and adapted to enter the beer container, the tube and housing being spaced apart to form an annular chamber closed at one end and adapted to communicate at its other end with the beer container, a chamber in the housing communicating with the beer container externally of the draft tube, a gas intake for said chamber, valve mechanism in the chamber controlling the supply of gas to the beer container, a second chamber in the housing, a diaphragm in the second housing, a valve carried by the diaphragm, a valve seat provided with a passageway communicating with the atmosphere, a relatively large screened passageway and a relatively small, valve-controlled passageway communicating with each other and located between said second chamber and the annular chamber.

HENRY C. WILLIAMSON.